United States Patent [19]

Mastache

[11] Patent Number: 5,036,416
[45] Date of Patent: Jul. 30, 1991

[54] AERODYNAMICALLY RELEASABLE LOCK FOR A DISK FILE ACTUATOR ASSEMBLY

[75] Inventor: Mark D. Mastache, Boise, Id.

[73] Assignee: Hewlett-Packard Company, Palo Alto, Calif.

[21] Appl. No.: 504,373

[22] Filed: Apr. 3, 1990

[51] Int. Cl.[5] .......................... G11B 5/54; G11B 5/12
[52] U.S. Cl. .................................... 360/105; 360/86
[58] Field of Search ............... 360/105, 106, 137, 109

[56] References Cited
U.S. PATENT DOCUMENTS

| 4,538,193 | 8/1985 | Dimmick et al. | 360/137 |
| 4,647,997 | 3/1987 | Westwood | 360/105 |
| 4,692,829 | 9/1987 | Campbell | 360/105 |

Primary Examiner—A. J. Heinz
Assistant Examiner—Jefferson Evans
Attorney, Agent, or Firm—E. F. Oberheim

[57] ABSTRACT

An actuator lock for a disk drive in which fixed air vanes projecting between a adjacent disks divert air flow, generated by disk rotation, into a narrowing passage adjacent the disks to impinge upon an air vane forming part of a rotatably mounted actuator lock, to angularly move the actuator lock to release an actuator assembly for movement of the magnetic heads thereon in track seeking and track following operations.

5 Claims, 2 Drawing Sheets 3,036,416

AERODYNAMICALLY RELEASABLE LOCK FOR A DISK FILE ACTUATOR ASSEMBLY

BACKGROUND OF THE INVENTION

This invention relates generally to disk drives or disk files employing aerodynamically releasable locks, operable when the disk drives are not operating, to lock the actuator assembly against movement with the magnetic heads thereon positioned in a landing zone on the disks.

Typical disk drives or files are illustrated in U. S. Pat. Nos. 4,538,193, 4,647,997 and 4,692,892.

These disk drives each comprise a disk stack. Magnetic heads on an arm stack, forming part of an actuator assembly, are moved across the tracks and positioned by the actuator assembly at a selected track, in track seeking and track following modes operation. When the disk drive is to be stopped, the actuator assembly moves the magnetic heads to a location outside of the disk areas in which data tracks are recorded, to a disk area called the landing zone, usually near the center of the disks. When the disk drive is to be stopped the actuator assembly moves the magnetic heads to the landing zone. When the drive is de-energized and the disks spin down, the magnetic heads land and slide on the disk surfaces in the landing zone. To prevent damage to the tracks recorded on the disks, resulting from unwanted actuator assembly movement, dragging the magnetic heads across the tracks, when the disk drive is inactive, each disk drive in the referenced patents comprises an aerodynamically operated lock for the actuator assembly. The respective aerodynamically operated locks are pivotally mounted and have one or more vanes individually projecting between adjacent disks in the disk stack. The aerodynamically operated locks are rotated to a position unlocking the actuator assembly by the force of moving air impinging on the vanes, generated as a result of disk rotation. Spring coupled or magnetically coupled torques rotate the locks to move a projection or latch on each of the aerodynamically operated locks, in the absence of aerodynamic forces on the vanes when the disk drive is stopped, to a position engaging a notch or catch on the actuator assembly to secure the actuator assembly in a position with the magnetic heads in the landing zone.

As the disk drives are reduced in size, the air volume between the disks diminishes due to the reduction in the axial spacing of the disks and due to the reduction in disk diameter. For a given rotational speed, the reduction in the diameter of the disks also reduces the tangential velocity of the air. The volume of air flow generated per unit of time, by rotation of the disks in the small disk drives, is therefore significantly diminished. Additionally, the moveable air vanes projecting between the adjacent disks are reduced in size both in length and in width, reducing their surface area. The reduction in aerodynamic force per unit area together with the reduction in air vane surface area, diminishes the total aerodynamic force to a point where operation becomes marginal.

To be effective, the air vanes must have small clearance with adjacent disk surfaces and be of low mass. This requires precise support, positioning and journaling of the actuator lock to avoid contact of the vanes with the disk between the extremes of actuator lock rotation, and sufficient air vane rigidity to avoid air vane deflection and contact with the adjacent disk surfaces, in the presence of forces due to acceleration. This places stringent requirements on fabrication to achieve the necessary mechanical precision and stability.

SUMMARY OF THE INVENTION

Improvement in aerodynamic actuator lock structure and function for locking and unlocking the actuator assembly for the magnetic heads in a disk drive, is achieved, according to this invention, by employing fixed vanes to deflect moving air generated by disk rotation, from locations between the disks comprising a disk stack, and funneling or directing all of the deflected air through a narrowing passage, to increase air velocity. Fixed vanes are easily closely fitted between all of the disks to maximize the volume per unit time of the deflected air. The narrowing passage converges at an opening at its narrow end confronting an air vane on a movably mounted aerodynamic actuator lock. The air vane spans the opening. Air flow exiting the opening impinges upon the air vane. The resulting force moves a latch on the aerodynamic actuator lock to unlock the actuator assembly. The moveable aerodynamic actuator lock may be mounted to move linearly or angularly to actuate the latch. Also the actuator assembly may be mounted either for rotatable movement or for linear movement.

The invention will be better understood by reference to the accompanying drawings when considered in conjunction with the descriptive disclosure which follows, in which.

DESCRIPTION OF THE PREFERRED EMBODIMENT

Figure 1:
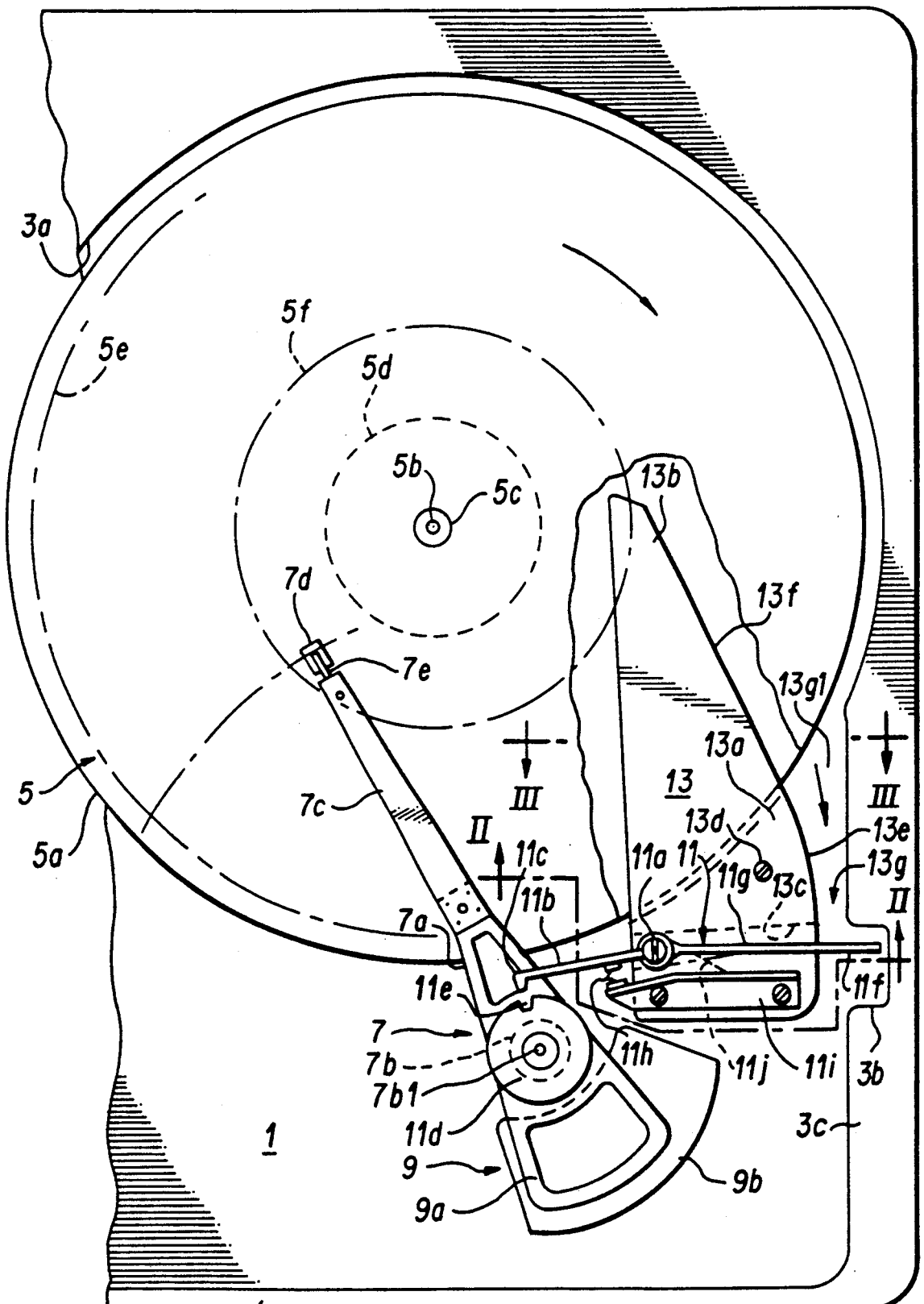
FIG. 1 is a plan view of a rotatory magnetic head actuator type of disk drive having an aerodynamic actuator lock, embodying the principles of this invention.

In FIG. 1, the invention is illustrated in its application in a disk drive having a rotatory actuator assembly for the magnetic heads. It will be appreciated however, that this invention is equally applicable in locking and unlocking a linearly movable actuator assembly in a disk drive.

The disk drive 1 of FIG. 1 comprises a housing 3. A disk stack 5 comprising a plurality of individual disks 5a is mounted on a spindle 5c in the housing 3 for rotation about the spindle axis 5b. The disk stack 5 is driven at constant speed by a motor 5d. Servo code and/or data recordings are recorded in concentric tracks on the surfaces of the individual disks in areas bounded by an outer track 5e and an inner track 5f. The inner track 5f is the inner end of the data zone. Servo code is also written in the landing zone and is useful in controlling the inner radial position of the magnetic heads. Rotation of the disk stack is clockwise as shown by the arrow in this illustration.

A rotatory actuator assembly, generally designated 7, comprises an arm stack 7a which may be of one piece or of integrated construction, which is jornalled by means of a bearing housing 7b for angular movement about a spindle 7b1. The arm stack 7a conventially comprises a plurality of individual arms 7a the ends of which project between the disks 5a. Load beams 7c are mounted on these ends of the individual arms 7a. Magnetic heads 7d are mounted on the ends of the load beams 7c by means of spring 7e, which are flat leaf springs, configured to provide angular freedom of the magnetic heads 7d in both roll and pitch. The rotary actuator assembly 7 is illustrated in its inactive position which is the position it has been moved to and occupies before power is removed from the disk drive. During the power down operation, as the disks spin down, the magnetic heads settle in the area between the inner track recording 5f and the center of the disk 5b in what is called a landing zone. The magnetic heads 7d land in this area and ride on the disk surface as the disks 5a spin down and stop.

An aerodynamic actuator lock is generally designated 11. It is provided to lock the actuator assembly 7 in its inactive position, so that shipping, or handling, or any movement of the equiment in which the disk drive is installed, does not result in inadvertent angular movement of the actuator assembly 7, which would cause the magnetic heads 7d to sweep across the track recording area between the inner and outer tracks 5f and 5e, which could damage both the disk surfaces and the magnetic heads. The aerodynamic actuator lock 11 is journaled on a spindle which may comprise a bolt 11a in a fixed vane structure 13. The fixed vane structure 13 comprises a base section 13a, in which the spindle bolt 11a is mounted, and a plurality of vanes 13b projecting in fixed position between the disks 5a from the base section 13a. Screws 13d secure the vane structure 13 to the base of the housing 3.

Figure 2:
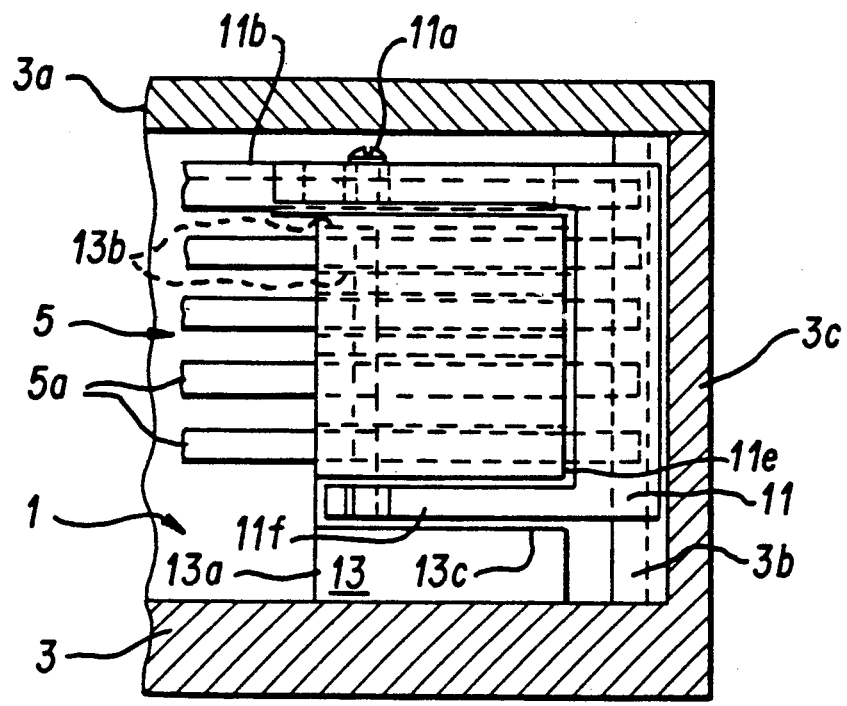
FIG. 2 is a fragmentary cross sectional view taken on the line II—II of FIG. 1.
Figure 3:
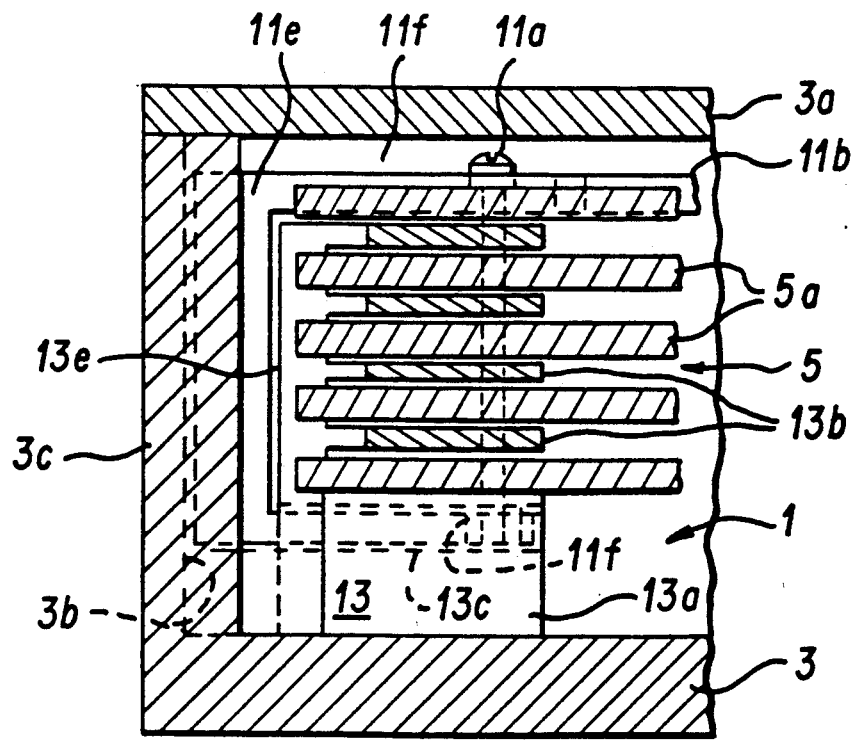
FIG. 3 is a fragmentary cross sectional view taken on the line III—III of FIG. 1.

The sectional views of FIGS. 2 and 3 illustrate additional features and details of the vane structure 13 and the a erodynamic actuator lock 11. As seen in FIGS. 1 and 2 the aerodynamic actuator lock 11, on the left side of the axis of the spindle bolt 11a, comprises a latch arm 11b which carries a latch member 11c at its end. The latch member 11c cooperates with a catch member 11d which is secured to the magnetic head actuator 7 and rotates therewith about the axis of the spindle 7b1. A notch 11e in the catch member 11d receives the latch member 11c when the aerodynamic actuator lock 11 is rotated counter clockwise from the position which is illustrated. The latch member 11c and the notch 11e in the catch member 11d are indexed as shown whenever the magnetic head actuator 7 is in its inactive or parked position, with a magnetic head 7d in the landing zone.

Means for rotating the aerodynamic actuator lock 11 in a counter clockwise direction comprise two alternatives, herein illustrated. One alternative comprises the confronting magnets 11b, one of which is mounted on the aerodynamic actuator lock 11 and the other of which is mounted on the left end of a bracket 11i secured to the base 13a of the vane structure 13. These magnets, 11h, are poled to attract one another. In the position shown, these magnets do not contact one another whenever the latch member 11c engages the notch 11e in the catch member 11d. The relative displacement being such as to involve only a small change in the magnetic coupling and, hence, in the torque engaging the latch 11c with the notch 11e. Alternatively a spring 11j wrapped about a central circular portion of the actuator lock 11, through which the bolt 11a is fitted, has crossig end portions 11j, one of which engages a face of the bracket 11i and the other of which engages an upper vane arm 11g of the aerodynamic actuator lock 11. These end portions 11j of the spring 11j rotate the aerodynamic actuator lock 11 in a counter clockwise direction, again for the purpose of engaging the latch member 11c in the notch 11e of the catch member 11d.

As seen in FIGS. 2 and 3 the aerodynamic actuator lock 11 is of generally U shaped configuration and comprises an air vane 11f which is supported upon the ends of the upper and lower air vane arms 11g. As seen in FIG. 2, the air vane 11f straddles the disks 5a in the disk stack 5. The end face of the base 13a of the vane structure 13 is slotted at 13c receive the lower vane arm 11g. In this position, the spindle bolt 11a, functioning as the spindle, passes through the air vane arms 11g and the base 13a. The hole in the base 13a to which the spindle bolt 11a passes may provide a slight clearance so that the spindle bolt 11a may clear through this hole in the base 13a and threadedly engage the end of the lower air vane arm 11g to pivotally secure the aerodynamic actuator lock 11 and to provide free angular movement.

In this assembly, the housing 3 comprises a cover 3a which is fitted over the upper ends of side walls 3c to seal the disk drive within the housing. The air vane 11f at its outer end projects into a slot 3b in the side wall 3c of the housing. The vane structure 13 is provided with a side face 13e which cofronts the inner face of the side wall 3c of the housing 3. This side face 13e is curved and provides a smooth curved surface flowing from the leading edge 13f of individual vanes 13b and defining a narrowing channel or passage 13g1 from the disks 5a to the air vane 11f. The passage 13g1 has an opening 13g adjacent the confronting face of the air vane 11f.

The individual vanes 13b are fitted between the individual disks 5a, their thickness being such as to provide a slight clearance between the confronting faces of the individual vanes 13b and the disks 5a. Thus air flow, generated by rotation of the disks 5a during operation of the disk drive 1, impinges upon the leading edges 13f of the individual vanes 13b and is diverted or deflected into the narrowing passage 13g1 to exit at the opening 13g and impinge upon the confronting face of the air vane 11f of the aerodynamic actuator lock 11. The leading edge 13f of each of the vanes 13b is disposed at a shallow angle with respect to the direction of airflow thereat, to minimize energy losses in diverting the air flow into the narrowing passage 13g1. Additionally, the width of the individual vanes 13b in the direction of air flow is large, measured circumferentially of the disk, to provide a significant pressure gradient between the leading edge 13f the and trailing edge of the vanes 13b, to provide an effective seal against the leakage of air through the small clearance space between the confronting faces of a vane 13b and the adjacent disks 5a, while at the same time providing clearance for the film of air clinging to a disk surface, on which the magnetic heads 7d fly, to pass the vanes 13b. Disturbances in this air film, however, occurring from the introduction of air turbulence generators, such as vanes 13b, in positions between the surfaces of the disks 5a, have been found to improve magnetic head flight performance.

This structure provides efficient and effective scavenging and deflecting of the air flow generated by rotation of the disks 5a. Since the vanes 13b are stationary, their cross sectional dimensions, particularly circumferentially, may be increased to provide dimensional stability and rigidity in a degree not available with aerodynamic actuator locks involving moving air vanes between the disks. by diverting air flow from positions between the disks 5a into a passage 13g1 which narrows in the direction of air flow and opening the narrow end of that passage at 13g in a position confronting an air vane 11f, the volume and velocity of air flow is significantly increased, resulting in an aerodynamic force acting on the air vane 11f to torque the aerodynamic actuator lock in a degree providing positive release of the rotary actuator assembly 7. Thus the spring coupled or magnetic coupled torques on the aerodynamic actuator lock 11, for locking the rotary actuator assembly 7, may be commensurate to provide positive latching.

The actuator lock 11 functions during the power up, when the disk stack 5 is brought up to operational speed, to unlock the rotary actuator assembly 7 by the time the disk stack 5 is rotating at operational speed. The magnetic heads 7d are then flying in the landing zone, riding on the thin film of air clinging to and moving with the adjacent surfaces of the disks 5a. In this situation, the rotary actuator assembly 7 may be moved to provide track seeking and track following operations of the magnetic heads 7d.

Although the invention has been illustrated in the environment of a disk drive having a rotary actuator assembly 7, it will be apparent to those skilled in the art that this invention may also be practiced in a disk drive involving a linear actuator. In this situation the vane structure 13 and the actuator lock 11 may remain in the positions illustrated. The latch arm 11b is at a different angle to the air vane arms 11q than that illustrated, beside and substantially paralleling the direction of movement of the linear actuator, with latch member 11c adapted to engage a notch such as the notch 11e in a catch member fastened to and moving with the linear actuator, so that angular movement of the actuator lock due to aerodynamic forces, rotates the latch member 11c away from the side of the linear actuator.

Other specific variations in the design of the housing, the vanes the actuator lock and other features in differently confiqured environments, will be readily apparent to those skilled the art.

What is claimed is:

1. In a disk drive having a housing, a rotatably mounted stack of memory disks in said housing, concentric track recordings on the surfaces of said disks, an actuator assembly supported in said housing, whih includes a moveable actuator body, arms mounted on said moveable actuator body to project between said disks, magnetic heads on the ends of said arms, between said disks, means for moving said actuator assembly to move said magnetic heads substantially radially of said concentric track recordings from and to a landing zone on said disks removed from said track recordings, the improvement which comprises;
   an actuator lock having an air vane and a latch member;
   means movably mounting said actuator lock adjacent said moveable actuator assembly;
   a catch member on said moveable actuator assembly for engagement by said latch member when said magnetic heads are positioned in said landing zone;
   biasing means coupled to said actuator lock to bias said actuator lock to engage said latch member with said catch member when said magnetic heads are in said landing zone;
   a van structure comprising a base secured to said housing;
   individually fixed vanes on said base individually projecting between adjacent disks to deflect moving air from between said disks, generated by disk rotation; and
   means in said housing defining with said vane structure an air passage converging and narrowing towards said air vane and having an opening adjacent said air vane for exhausting air in said passage against said air vane to move said air vane of said actuator lock and the attached latch member to release said latch member from said catch member.

2. The actuator lock according to claim 1, in which; said means movably mounting said actuator lock is a pivotal mount.

3. The actuator lock according to claim 1, in which; said biasing means comprises a spring.

4. The actuator lock according to claim 1, in which; said biasing means comprises permanent magnets.

5. The actuator lock according to claim 4, in which: said permanent magnets are poled to attract one another.

* * * * *